(12) United States Patent
Ketari

(10) Patent No.: US 8,112,037 B2
(45) Date of Patent: Feb. 7, 2012

(54) BLUETOOTH ASSISTANT

(76) Inventor: Nissaf Ketari, Tunis (TN)

( * ) Notice: Subject to any disclaimer, the term of this patent is extended or adjusted under 35 U.S.C. 154(b) by 631 days.

(21) Appl. No.: 12/203,049

(22) Filed: Sep. 2, 2008

(65) Prior Publication Data

US 2010/0056055 A1   Mar. 4, 2010

(51) Int. Cl.
  *H04B 7/00* (2006.01)
(52) U.S. Cl. ............ 455/41.3; 455/41.1; 455/41.2
(58) Field of Classification Search ........... 455/41.2, 455/41.3, 426.1, 552.1, 556.1, 556.2, 557, 455/569.1
See application file for complete search history.

(56) References Cited

U.S. PATENT DOCUMENTS

| | | | |
|---|---|---|---|
| 7,259,671 B2 * | 8/2007 | Ganley et al. | 340/539.23 |
| 2009/0017881 A1 * | 1/2009 | Madrigal | 455/575.1 |
| 2009/0033459 A1 * | 2/2009 | Ichihara | 340/5.28 |

* cited by examiner

*Primary Examiner* — Tuan H Nguyen
(74) *Attorney, Agent, or Firm* — Daniel Schein, Esq.

(57) ABSTRACT

A method and apparatus for facilitating carrying a Bluetooth assistant comprising two detachable parts, with an attachment system in the first part and a rotatable earpiece in the second part. A user can conveniently carry the Bluetooth assistant as a key chain or a clip, and when needed, can detach the second part, rotate an earpiece and use it as a headset. The second part can monitor proximity to a mobile phone when not used as a headset and alarm if the mobile phone is not in proximity. The second part can also serve as a wireless key for unlocking one or multiple doors, personal electronic devices and/or encrypted data. When the user acquires a new lock, the wireless key can be updated to unlock that new lock.

14 Claims, 6 Drawing Sheets

BLUETOOTH ASSISTANT

FIELD OF THE INVENTION

The present inventions relate to a Bluetooth assistant apparatus and more specifically relates to a multi-function Bluetooth device that is easy to carry and that can provide several functions including voice function.

BACKGROUND

Over 100 million Bluetooth headsets are sold a yet, and yet, these devices do not have a convenient way to carry them when not in use. Most people either carry in their ears, or risk loosing them. Furthermore, users are now compelled to carry a new device with them, and there has not been any successful attempt to either integrate Bluetooth headset functionality into existing devices, or to integrate more functionality into Bluetooth headsets.

More and more personal data is being stored on ever smaller and more mobile devices. The risk that sensitive data regarding identity, access codes, or business information could be compromised if one of these devices is misplaced increases with the amount of information that can be stored on them and their increasingly pervasive use. Requiring the entry of security codes or keys is a partial solution, but the efficacy of this solution decreases to the extent that the data onboard the device can be used if the mobile device lands in the wrong hands.

Portable electronic devices such as cellular telephones, personal digital assistants (PDAs), wireless email devices, instant messaging devices, pagers, portable compact disk (CD) players, portable MP3 players, and others are often forgotten, lost, or stolen (a "PED" includes any portable device that can be used for communication, performing intellectual and/or physical work, and/or entertainment).

A method for protecting data onboard a personal electronic device (PED) is disclosed in US patent application 0060199538, titled: Automatic data encryption and access control based on BLUETOOTH device proximity which decrypts data on contact with a paired BLUETOOTH device, and encrypts the data on loss of contact. This method is inefficient, can cause data corruption, and more importantly, it does not provide high level security. The Bluetooth ID of paired Bluetooth device can be obtained from the operating system, and can be used to fake the BLUETOOTH device.

It is noted that PED can refer to a computer, a mobile phone, a handheld device, an information system, a vehicle electronic computer, or any electronic system.

US Patent application publication 20050280546 discloses two mobile transceivers that are linked through a BLUETOOTH link. The BLUETOOTH enabled RF link between the first and second mobile transceiver units forms a monitoring piconet. The second mobile transceiver unit provides an alarm indication when the first mobile transceiver unit moves beyond a distance of approximately ten meters from the second mobile transceiver unit. The second device repeatedly pages the first device, and waits for a response. If a response is not received, an alarm is issued. This method has been tested and found to be unreliable due to high energy consumption and due to the human body blocking Bluetooth signals.

U.S. Pat. No. 6,885,848 is directed to an apparatus for preventing the loss of a portable telephone that uses BLUETOOTH communication protocol. The signal strength is periodically monitored and an alarm issued to the headphone when the signal is below a threshold. BLUETOOTH protocol provides for a received signal strength indicator (RSSI) value or the Link Quality value to be determined at any time. If the value received is below a threshold, an alarm is issued to the headphone. This system may reduce the chance that a portable telephone is lost or stolen, but if the mobile phone falls in the wrong hands, this system does not prevent the data from being accessed.

Thus, a need exists for a method and apparatus for a Bluetooth assistant that can be carried conveniently, that provides Bluetooth headset functionality, and that can provides further functions such as proximity alarm for personal electronic device and unlocking of protected areas.

SUMMARY OF THE INVENTION

An apparatus comprising: a first detachable part comprising an attachment system, a second part comprising: a single wireless transceiver integrated circuit selected from the set comprising: BLUETOOTH, Wifi and Wibree transceiver integrated circuit, a power input, a third part comprising an audio system, said third part can move relative to said second part, wherein said apparatus can pair with one or more apparatus with compatible transceiver in a first range.

A method for using a Bluetooth wireless headset comprising: detaching said Bluetooth wireless headset from a first part, said first part comprising an attachment system, moving a second part relative to said Bluetooth wireless headset, said second part comprising an audio system, wirelessly receiving voice from a paired personal electronic device.

An apparatus for providing access comprising: a single wireless transceiver integrated circuit selected from the set comprising: BLUETOOTH, Wifi and Wibree transceiver integrated circuit, said apparatus stores at least one digital code, on receipt of a message from a compatible transceiver, said apparatus extracts operation codes and operands, said apparatus executes operations corresponding to said operation codes to obfuscate said at least one digital code, said apparatus wirelessly transmits results of said operations to said compatible transceiver.

BRIEF DESCRIPTION OF THE FIGURES

The present inventions may be more clearly understood by referring to the following figures and further details of the inventions that follow.

Similar reference numerals are used in different figures to denote similar components.

FURTHER DETAILS OF THE INVENTIONS

Figure 1:
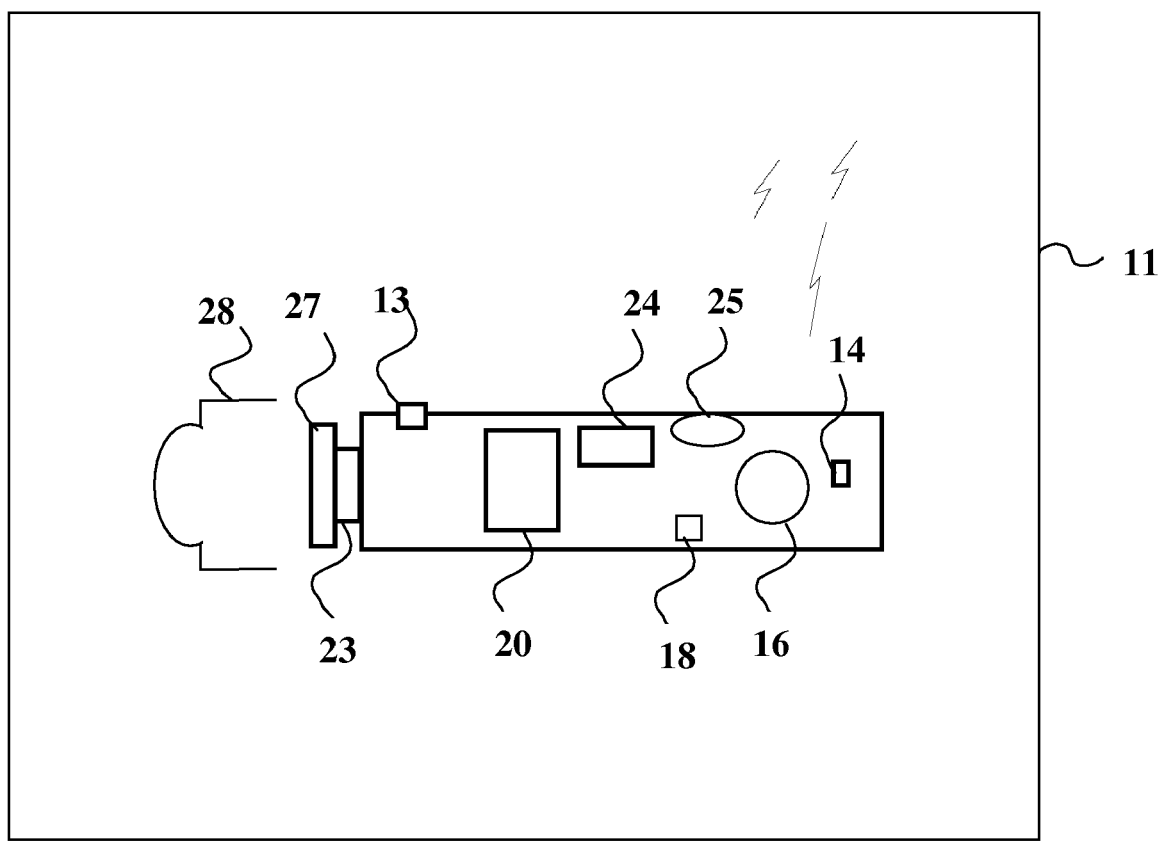
FIG. 1 is a schematic of a Bluetooth assistant device.

The following provides further details of the present inventions summarized above and illustrated in a schematic fashion in the Figures. In accordance with a first aspect of the present inventions, FIG. 1 is a schematic illustration of a Bluetooth assistant 11 comprising a transceiver system 20 connected with activation switches 13, visual indication center (or display) 16, power store 24, communication center 25, antenna 14, Audio center 18, bearing 23, speaker 27 and capsule 28.

Display 16 can be used to indicate the status of the device, such as whether it is powered, if the BLUETOOTH transceiver system (BT) is discoverable or non-discoverable, if the BT is pairing or paired with another BT, the BT mode, inter alia. Audio center 18 can be any type of microphone, speaker, earphone wire, etc. In a preferred embodiment, the electronic components of Bluetooth assistant 11 can be fit into a volume of about 60×30×10 mm or 18 cc or less. For example, Bluetooth assistant 11 may be fit into a volume less than about 56 cc, 22.5 cc, 18 cc or 10 cc.

Speaker 27 is an audio system, an earphone, a speaker that fits in the ear or a loud speaker.

Bearing 23 can be a pivot, articulation, U joint, a ball joint, pop-up coil, slide rail, a telescoping tube, or any attachment mechanism for a detachable or movable earpiece. Bearing 23 may be mounted to speaker 27 and may allow adjusting the angle and distance of speaker 27 relative to the main body of Bluetooth assistant 11 across one or more planes for better comfort.

Capsule 28 can easily attach and detach to Bluetooth assistant 11. Capsule 28 allows to protect speaker 27 while not in use. Capsule 28 can attach to a key chain and allows to easily carry Bluetooth assistant 11 as a key chain when not in use as a headset, and to easily detach it and use it as a headset when needed.

Control or activation switches 13 can be any type of button, switch, remote sensor, touch sensor, contact sensor, bio sensor, key pad to enter password or activation system. Activation switches 13 are used to turn the Bluetooth assistant 11 ON/OFF, to shut off the alarm of communication center 25. For example, a single control button can cycle through a menu of functions by changing the length of time that the button is held and/or the speed with which a first press is followed by a second press (analogous to the single and double click on a computer mouse). One or two control buttons coupled with a simple display screen can adjust a variety of operational parameters. Transceiver system 20 is preferably a Bluetooth transceiver. In an alternative embodiment, transceiver 20 can be Wibree or Wifi. Transceiver 20 enables connectivity over the 2.4 GHz radio frequency (RF) band. Transceiver system 20 includes a radio and base band IC/integrated circuit for BLUETOOTH 2.4 GHz systems. BLUETOOTH ICs are generally available from manufacturers such as CSR or Broadcom, and comprises a full system including baseband, processor, RF front end, RAM/Flash/ROM.

In a preferred embodiment, transceiver system 20 includes ROM, Flash memory or external memory or any other type of memory. In an alternative embodiment, transceiver system 20 includes a power amplifier (PA) and/or low noise amplifier (LNA) for increasing the BLUETOOTH transmission range. In a preferred embodiment, transceiver system 20 includes a processor, RAM and Flash. Software/firmware can be loaded on Flash using SPI flashing. The processor executes the BLUETOOTH protocol, as well as the firmware that provides custom functionality (example: proximity detection, alarming functionality, applying transformations, transferring keys . . . ). The processor can also execute other functionality such as sending files on pairing, flashing lights, providing voice functionality, relaying voice to a remote BLUETOOTH device, detecting connection from a remote BLUETOOTH device, etc.

Power store 24 provides power to some of the components of Bluetooth assistant 11. Power store 24 can be a capacitor, a battery (fuel cell, nickel-cadmium, lithium, lithium polymer, lithium ion, alkaline or nickel-hydride battery or any other portable source of electric power) or a combination of a capacitor and a battery, whereby the capacitor onboard a main unit is used to power transceiver system 20 for a number of utilizations and it can be charged from time to time by attaching the main unit to a detachable battery unit. Power store 24 can also be replaced with photovoltaic cells, a rechargeable battery, or a battery rechargeable from a distance (such as by induction). When Bluetooth assistant 11 is not in operation it remains in a dormant state ("sleep-mode") to conserve the energy of power store 24. For example, small 1.5 volt batteries, and the like, such as those used in small devices like hearing aids, calculators and watches are widely available and can be used as for a power source. One of ordinary skill in the art can readily determine the battery size and power requirements for different embodiments of the present inventions. It is envisioned that other low power specifications can be used in connection with the present inventions. For example, an ultra-low-power wireless technology called Wibree has been developed. Wibree addresses devices with very low battery capacity and can be easily integrated with BLUETOOTH technology.

Visual indication center 16 comprises one or more LED. The LED can turn on and off periodically to indicate the system is on. The color and frequency of the LEDs can indicate different events such as normal mode, pairing mode, alarm mode, low battery mode, voice mode, etc In a preferred embodiment, visual indication center 16 while indicating the status of the system also illuminates a customizable face plate, made out of clear material such as acrylic. A logo or graphic can be printed on the face plate thus allowing to easily and economically change the look and branding of the device. This automatically leverages the visual indication center, and adds a promotional value and function to the device, above and beyond the main functions.

In another embodiment, visual indication center 16 can be an LCD or any other indication means. The messages may be collected by transceiver 20 when user passes in proximity to a compatible transmitter and may be displayed on the LCD.

Communication center 25 includes an alarm audible from a distance greater than 3 feet. A regular alarm is between 65 and 120 decibels at 10 feet. Noise levels above 85 decibels can harm hearing over time. Noise levels above 140 decibels can cause damage to hearing after just one exposure. In a preferred embodiment, communication center 25 has more than 50 decibels or 50 dBA at 10 feet or exceeds ambient sound level by 5 decibels minimum. In a preferred embodiment, the alarm provides an audible signal of at least 60 decibels at 10 cm, or an audible alarm at 0.5 meter to notify the user of a designated event, such as a laptop or phone left behind. The human ear does not respond equally to all frequencies: humans are much more sensitive to sounds in the frequency range about 1 kHz to 4 kHz (1000 to 4000 vibrations per second) than to very low or high frequency sounds. Sound meters are usually fitted with a filter that has a frequency response similar to the human ear. If the "A weighting filter" is used, the sound pressure level is given in units of dB(A) or dBA. In residential areas, most noise comes from transportation, construction, industrial, and human and animal sources. Road traffic noise is the leading source of community noise. The noise can be highly variable. It is common that Day-Night sound levels in different areas vary over a range of 50 dB. The outdoor level in a wilderness area may occur as low as 30 to 40 dBA, and as high as 85-90 dBA in an urban area. Most urban dwellers lives in areas of noise level more than 48 dBA.

Communication center 25 can be any type of audio, video, tactile or mechanical interface means capable of conveying information to the user. Communication center 25 can also be any type of data port, connector, USB connector, mini USB connector for exchanging information with a personal computer. In another preferred embodiment, communication center 25 is used to flash one or more digital keys or a program onto Bluetooth assistant 11 using an application that runs on a PC. For example, a user may buy a new door handle compatible with Bluetooth assistant 11, and may update the digital key associated with the door handle onto Bluetooth assistant 11 so that Bluetooth assistant 11 can work with the new door handle. In this scenario, when the user opens the door handle, the door handle automatically authenticates Bluetooth assistant 11 and automatically unlocks. When the door handle looses connection with Bluetooth assistant 11, the door handle may automatically lock. Flash or flashing is a process for writing data to flash memory. A commonly used process to flash BLUETOOTH devices consists of: using SPI (Serial Programming Interface) protocol and sending/receiving data to BLUETOOTH device through 4 connections: MOSI, MISO, CLK, CSB. The 4 connections (and GND) can be tied directly to ports on the LPT port. Alternatively, the 4 connections are tied to ports onboard a USB to SPI converter, and the USB to SPI converter is connected to USB port onboard the personal computer. A flashing program runs on PED, and sends flashing instructions to either BLUETOOTH chipset directly through SPI protocol, or to USB to SPI converter which in turns sends flashing instructions to BLUETOOTH chipset through SPI protocol. SPI flashing allows to load a new program or to change parameters.

In another preferred embodiment, communication center 25 is used to flash private information such as passwords for different web sites, data bases, computers, etc and associated information onto Bluetooth assistant 11. Audio means can be any audio device such as a speaker, a buzzer, a Piezo buzzer, omni-directional speaker, directional speaker, an ultrasound or any other audio device. Visual means can be an LED, or any visual information display device. Tactile means can be any tactile sensor such as a vibrator, or a heat-generating device.

Antenna 14 can be any type of antenna including chip antenna, patch antenna, PCB antenna and dipole antennas. In another embodiment, antenna 14 is not installed.

In a preferred embodiment, the components of the Bluetooth assistant 11 can fit in a volume less about 60×30×10 mm or 18 cc, so that Bluetooth assistant 11 can fit into a housing having an interior with dimensions of 60×30×10 mm or no more than 18 cc. In another embodiment, Bluetooth assistant 11 can fit into a volume 10 cc, and weigh about 50 grams or less, and preferably less than about 10 g. Devices of the present invention should take up minimal volume and be light weight. For example, each device of the present inventions will preferably fit into a space having a volume of 56 cubic centimeters, 25 cubic centimeters, 22.5 cubic centimeters, 18 cubic centimeters, 10 cubic centimeters, or 1 cubic centimeters, and each device of the present inventions preferably has a weight less than about 200 grams, less than about 50 grams, or less than about 10 grams.

An attachment mechanism or system, including but not limited to a hook, harness, notebook security lock, insert, pin, clip, badge, clip, key chain, car key, firearm activation key, ring, tee, dog collar, Velcro, ring, fastening mechanism, sticky surface are optionally attached to Bluetooth assistant 11.

The BLUETOOTH specification (a de facto standard containing information required to ensure that devices supporting BLUETOOTH can communicate with each other worldwide) defines two transmission ranges for personal area networking. The range is between 10 m and 100 m without a line of sight requirement. The radio link is capable of voice and data transmission up to a maximum capacity of 720 kbps per channel. Any other range can be designed.

A BLUETOOTH network is completely self organising, and ad hoc personal area networks (PANs) can be established wherever two or more BLUETOOTH/Wibree/Wifi devices are sufficiently close to establish radio contact. Equipment capable of BLUETOOTH connectivity is able to self-organise by automatically searching within range for other BLUETOOTH-enabled devices. Upon establishing a contact, information is exchanged which determines if the connection should be completed or not. During this first encounter, the BLUETOOTH devices connect via a process of authorisation and authentication.

BLUETOOTH Pairing happens when two BLUETOOTH enabled devices authenticate each other and agree to communicate with one another. When this happens, the two devices join what is can be referred to as a trusted pair. When one device recognizes another device in an established trusted pair, each device automatically accepts communication, bypassing the discovery and authentication process that normally happen during BLUETOOTH interactions. After pairing, each device may store the Bluetooth ID of the second device for future use.

When BLUETOOTH pairing is being set up, the following usually happens:

1. Device A (such as a handheld) searches for other BLUETOOTH enabled devices in the area.

How does A find these devices? The devices that are found all have a setting that makes them discoverable when other BLUETOOTH devices search. It's like raising your hand in a classroom: the discoverable devices are announcing their willingness to communicate with other BLUETOOTH devices. By contrast, many BLUETOOTH devices can toggle their discoverability settings off. When discoverability is off, the device will not appear when other devices search for it. Undiscoverable devices can still communicate with other BLUETOOTH devices, but they must initiate all the communications themselves.

2. A detects Device B (such as a second handheld that's discoverable).

During the discovery process, the discoverable devices usually broadcast what they are (such as a printer, a PC, a mobile phone, a handheld, etc.), and their BLUETOOTH Device Name (such as "Bob's Laptop" or "deskjet995c"). Depending on the device, you may be able to change the Device Name to something more specific. If there are 10 BLUETOOTH laptops and 5 BLUETOOTH mobile phones in range, and they are all discoverable, this can come in handy when selecting a specific device.

3. A asks B to send a Passkey or PIN

A passkey (or PIN) is a simple code shared by both devices to prove that both users agree to be part of the trusted pair. With devices that have a user interface, such as handhelds, mobile phones, and PCs, a participant must enter the passkey on the device. With other types of devices, such as printers and hands-free headsets, there is no interface for changing the passkey on the device, so the passkey is always the same (hard coded). A passkey used on most BLUETOOTH headsets is "0000". The passkeys from both parties must match.

4. A sends the passkey to B

Once you've entered the passkey on A, it sends that passkey to B for comparison. If B is an advanced device that needs the user to enter the same passkey, it will ask for the passkey. If not, it will simply use its standard, unchanging passkey.

5. B sends passkey back to A

If all goes well, and B's passkey is the same entered by A, a trusted pair is formed. This happens automatically when the passkeys agree. Once a trusted pair is developed, communication between the two devices should be relatively seamless, and shouldn't require the standard authentication process that occurs between two devices who are strangers. Embodiments of the present inventions take advantage of the reduced power requirements of certain BLUETOOTH modes following pairing of two BLUETOOTH enabled devices.

BLUETOOTH has several types:

i) Class 2: a class 2 BLUETOOTH transceiver can discover pair and communicate with any BLUETOOTH transceiver within a radius of 10 meters seamlessly.

ii) Class 1: A class 1 BLUETOOTH transceiver can discover pair and communicate with any BLUETOOTH transceiver within a radius of 100 meters.

iii) Class 3: A class 3 BLUETOOTH transceiver can discover pair and communicate with any BLUETOOTH transceiver within a radius of 2 meters.

iv) Non standard devices: can be designed to discover pair and communicate with any BLUETOOTH transceiver within any distance less than 300 meters.

Bluetooth inquiry procedure enables a device to discover which devices are in range, and determine the addresses and clocks for the devices. The inquiry procedure involves a unit sending out inquiry packets (inquiry state) and then receiving the inquiry reply. The unit that receives the inquiry packets (the destination), will hopefully be in the inquiry scan state to receive the inquiry packets. The destination will then enter the inquiry response state and send an inquiry reply to the source. After the inquiry procedure has completed, a connection can be established using the paging procedure. Paging Procedure is used to communication with another device directly using a device Bluetooth address. Paging allows sending packets to a specific Bluetooth device.

BLUETOOTH Wireless Technology Profiles: In order to use BLUETOOTH wireless technology, a device must be able to interpret certain BLUETOOTH profiles. The profiles define the possible applications. BLUETOOTH profiles are general behaviors through which BLUETOOTH enabled devices communicate with other devices. BLUETOOTH technology defines a wide range of profiles that describe many different types of uses.

At a minimum, each profile specification contains information on (1) dependency on other profiles, (2) suggested user interface formats, and (3) specific parts of the BLUETOOTH protocol stack used by the profile. To perform its task, each profile uses particular options and parameters at each layer of the stack. This may include an outline of the required service record, if appropriate.

Serial Port Profile (SPP). SPP defines how to set-up virtual serial ports and connect two BLUETOOTH enabled devices. SPP is based on the ETSI TS07.10 specification and uses the RFCOMM protocol to provide serial-port emulation. SPP provides a wireless replacement for existing RS-232 based serial communications applications and control signals. SPP provides the basis for the DUN, FAX, HSP and LAN profiles. This profile supports a data rate up to 128 kbit/sec. SPP is dependent on GAP.

Object Push Profile (OPP). OPP defines how to push a file to a BLUETOOTH device. When Bluetooth assistant 11 is first paired with PED, Bluetooth assistant 11 can automatically send a file to PED to install drivers and application program necessary for transferring messages and data between Bluetooth assistant 11 and PED.

RFCOMM. The RFCOMM protocol emulates the serial cable line settings and status of an RS-232 serial port and is used for providing serial data transfer. RFCOMM connects to the lower layers of the BLUETOOTH protocol stack through the L2CAP layer. By providing serial-port emulation, RFCOMM supports legacy serial-port applications while also supporting the OBEX protocol among others. RFCOMM is a subset of the ETSI TS 07.10 standard, along with some BLUETOOTH-specific adaptations.

Hands-Free Profile (HFP). HFP describes how a device can be used to pair, to connect to an audio gateway such as a mobile phone, and to place and receive calls. A typical application is a BLUETOOTH headset device or a BLUETOOTH car kit.

Hands-Free Audio Gateway Profile (AGHFP) describes how a gateway device such as a mobile phone can be used to pair, to connect and to send and receive calls to/from a hands-free device. A typical configuration is a mobile phone.

Headset Profile (HSP). The HSP describes how a BLUETOOTH enabled headset should communicate with a computer or other BLUETOOTH enabled device such as a mobile phone. When connected and configured, the headset can act as the remote device's audio input and output interface. The HSP relies on SCO for audio and a subset of AT commands from GSM 07.07 for minimal controls including the ability to ring, answer a call, hang up and adjust the volume.

Advanced Audio Distribution Profile (A2DP). A2DP describes how stereo quality audio can be streamed from a media source to a sink. The profile defines two roles of an audio source and sink. A typical usage scenario can be considered as the "walkman" class of media player. The audio source would be the music player and the audio sink is the wireless headset. A2DP defines the protocols and procedures that realize distribution of audio content of high-quality in mono or stereo on ACL channels. The term "advanced audio", therefore, should be distinguished from "BLUETOOTH audio", which indicates distribution of narrow band voice on SCO channels as defined in the baseband specification.

Audio/Video Control Transport Protocol (AVCTP). AVCTP describes the transport mechanisms to exchange messages for controlling A/V devices.

Audio/Video Distribution Transport Protocol (AVDTP). AVDTP defines A/V stream negotiation, establishment and transmission procedures.

Audio/Video Remote Control Profile (AVRCP). AVRCP is designed to provide a standard interface to control TVs, hi-fi equipment, or other A/C equipment to allow a single remote control (or other device) to control all the A/V equipment that a user has access to. It may be used in concert with A2DP or VDP. AVRCP defines how to control characteristics of streaming media. This includes pausing, stopping and starting playback and volume control as well as other types of remote control operations. The AVRCP defines two roles, that of a controller and a target device. The controller is typically considered the remote control device while the target device is the one whose characteristics are being altered. In a "walkman" type media player scenario, the control device may be a headset that allows tracks to be skipped and the target device would be the actual medial player.

This protocol specifies the scope of the AV/C Digital Interface Command Set (AV/C command set, defined by the 1394 trade association) to be applied, realizing simple implementation and easy operability. This protocol adopts the AV/C device model and command format for control messages and those messages are transported by the Audio/Video Control Transport Protocol (AVCTP).

In AVRCP, the controller translates the detected user action to the A/V control signal, and then transmits it to a remote BLUETOOTH enabled device. The functions available for a conventional infrared remote controller can be realized in this protocol. The remote control described in this protocol is designed specifically for A/V control only.

Dial-up Networking Profile (DUN). DUN provides a standard to access the Internet and other dial-up services over BLUETOOTH technology. The most common scenario is accessing the Internet from a laptop by dialing up on a mobile phone wirelessly. It is based on SPP and provides for relatively easy conversion of existing products through the many features that it has in common with the existing wired serial protocols for the same task. These include the AT command set specified in ETSI 07.07 and PPP.

Like other profiles built on top of SPP, the virtual serial link created by the lower layers of the BLUETOOTH protocol stack is transparent to applications using the DUN profile. Thus, the modem driver on the data-terminal device is unaware that it is communicating over BLUETOOTH technology. The application on the data-terminal device is similarly unaware that it is not connected to the gateway device by a cable. DUN describes two roles, the gateway and terminal devices. The gateway device provides network access for the terminal device. A typical configuration consists of a mobile phone acting as the gateway device for a personal computer acting as the terminal role.

General Audio/Video Distribution Profile (GAVDP). GAVDP provides the basis for A2DP and VDP, the basis of the systems designed for distributing video and audio streams using BLUETOOTH technology. GAVDP defines two roles, an initiator and an acceptor. In a typical usage scenario, a device such as a "walkman" is used as the initiator and a headset is used as the acceptor. GAVDP specifies signaling transaction procedures between two devices to set up, terminate and reconfigure streaming channels. The streaming parameters and encode/decode features are included in A2DP and VDP which depend on this profile.

In an embodiment, Bluetooth assistant 11 can be inserted beneath the skin or included inside the housing of objects such as portable computers or RFID badges. It can also be carried as a keychain or attached to people or objects through a hook, harness, notebook security lock, insert, pin, clip, badge, access card, clip, key chain, car key, firearm activation key, ring, tee, dog collar, Velcro fastener, ring, fastening mechanism, sticky or adhesive surface or any other attachment mechanism. Many notebook computers have a security slot on the side, which can be utilized by inserting a notebook security lock; the lock can be attached to an external device, such as a cable or desktop securing mechanism.

Bluetooth assistant 11 can also be encased in waterproof packaging and attached to clothes. The packaging can also be shock or impact resistant. System 11 can be incorporated in any other plastic or portable electronic device or object, including for example a cell phone, PDA, a wireless email device, an instant messaging device or pager, a portable computer, an MP3 player, a portable music player, a portable radio device, or any portable electronic device. Preferably, Bluetooth assistant 11 has dimensions of less than 10 cm×10 cm×5 cm (otherwise stated as "10×10×10 cm") and is less than 200 g in weight. In an embodiment, there are no manually operated controls (e.g., off-on or activation button is magnetically operated, so the housing is not provided with button or switch access), and the device may not have a display. In an embodiment, the housing of the device includes at least one seal and/or is waterproof so that immersion in water, or preferably even running the device through laundering machines, does not damage the electronic components. In a preferred embodiment, system 11 has a size equal to or smaller than 5 cm×3 cm×1.5 cm or 22.5 cubic centimeters ("cc"). A device having the desired functions of the present inventions can fit all of its components into a volume less than 1000 cc, preferably less than about 56 cc, 22.5 cc, and even 10 cc. Each mobile proximity sensor or remote sensor weighs less than 200 grams, preferably less than 50 g, and even less than 10 g. A preferred device has no than four manually operated buttons or switches, and preferably has only one manually operated button or activation switch and no more than one display. Each mobile proximity sensor consumes less than 50 mA.

An embodiment of a remote sensor for attachment to or carrying by a person has no manually operated controls and no display; such an embodiment would be difficult to disable and particularly durable to operate under robust physical and environmental challenges. Such a device might be carried by soldiers and law enforcement personnel and have a beacon or alarm that is activated should the housing be broken.

In another embodiment, transceiver system 20 comprises a second BLUETOOTH system that runs AGHFP profile, and that allows transceiver system 20 to function as a relay between a personal electronic device and a headset, thus the user can connection transceiver system 20 to a mobile phone and use all the functions of transceiver system 20, while at the same time use a headset.

Figure 2:
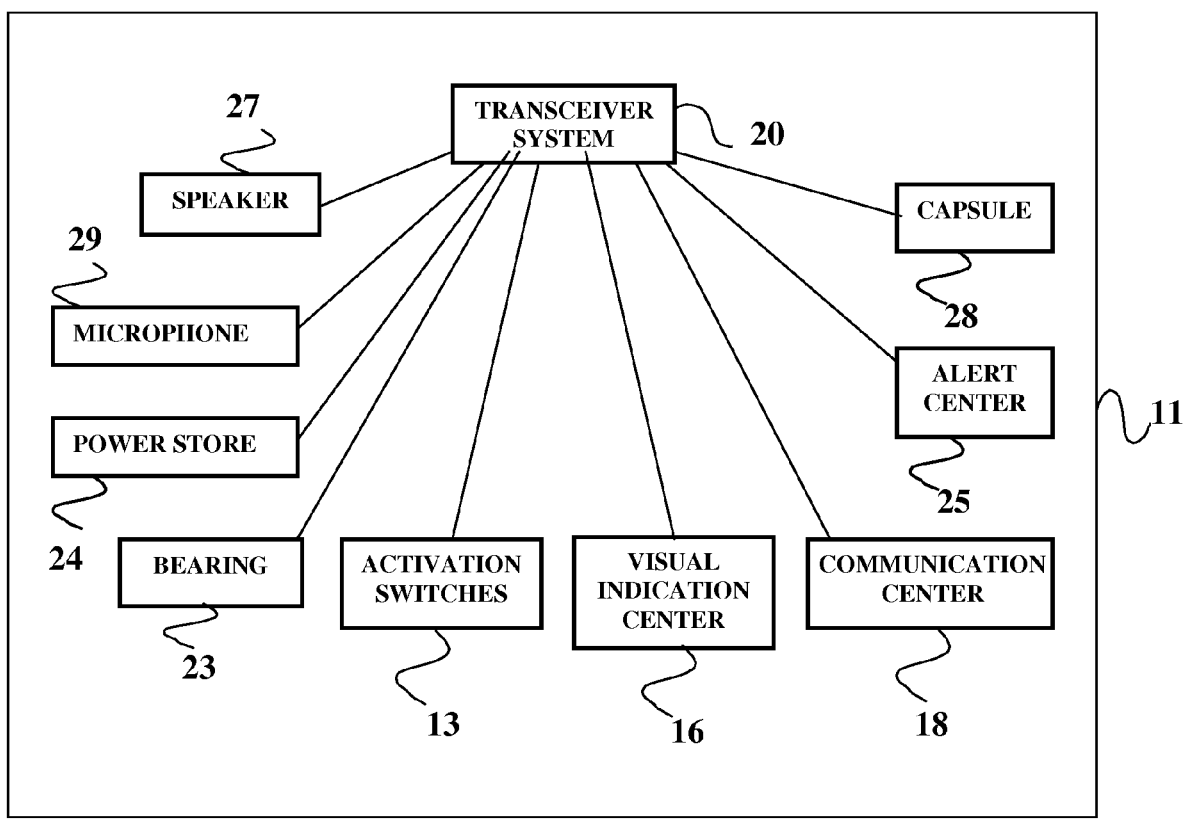
FIG. 2 is a block diagram of Bluetooth assistant device.

Referring to FIG. 2, in an embodiment, Bluetooth assistant 11 comprises a transceiver system 20 connected with activation switches 13, visual indication center 16, power store 24, communication center 25, audio center 18, bearing 23, speaker 27 and microphone 29. Microphone 29 is any device capable of capturing voice.

Figure 3:
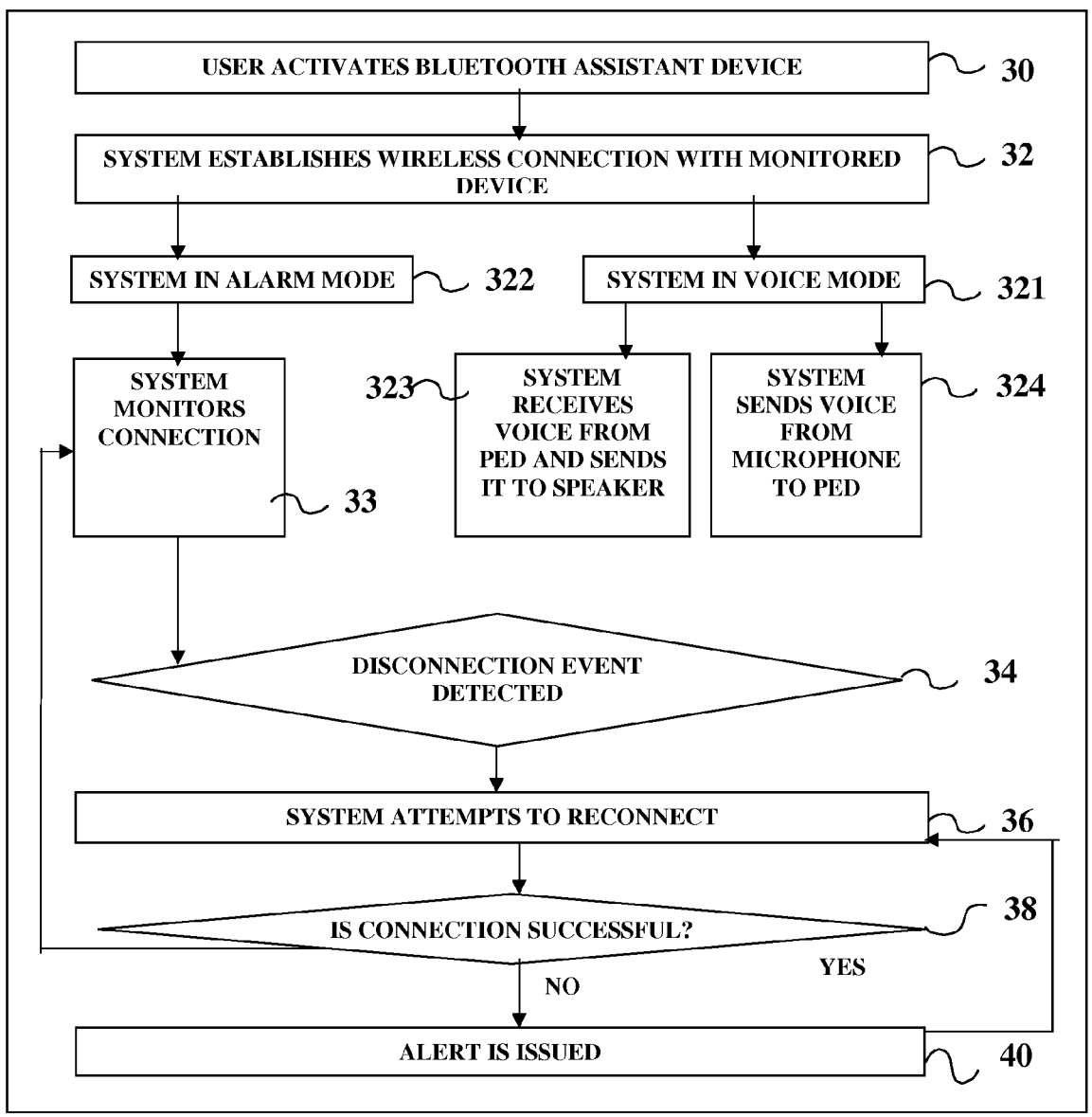
FIG. 3 is a flowchart illustrating the operation of Bluetooth assistant device.

Turning now to FIG. 3, the flowchart illustrates the steps involved in detecting that a portable electronic device is outside a desired range and for transmitting and receiving voice.

Since most people prefer to limit the number of devices they carry on them, this preferred embodiment allows combining BLUETOOTH headset functionality with proximity alarm functionality.

In step 32, unitary transceiver system 20 in a unitary base unit establishes a BLUETOOTH connection with a monitored remote device. The wireless connection can be a SPP (serial port profile) connection, HSP (headset profile) connection or a HFP (Hands-Free profile) connection. Other connection profiles that can be used include AGHFP (audio gateway HFP), RFCOMM, A2DP (advanced audio distribution profile), AVRCP (audio video remote control profile), AVCTP (audio video control transport protocol), AVDTP (audio video distribution transport protocol), DUN (dial up networking), and GAVDP (general audio video distribution profile).

In one embodiment, messages between said Bluetooth assistant 11 and said PED may be encrypted using regular encryption algorithms or using digital tones or any other encoding decoding method.

In one embodiment, transceiver system 20 does not redirect voice calls, thus the mobile phone operations remain intact. Transceiver system 20 uses a BLUETOOTH operational mode that uses minimal power, e.g., one of sniff, hold, or park modes. In a preferred embodiment, only BLUETOOTH sniff mode is used after pairing to assure low power usage and optimize convenience to the user by reducing the frequency of battery recharging or replacement.

In sniff mode, a device listens only periodically during specific sniff slots, but retains synchronization with the paired BLUETOOTH device onboard the monitored device. In other embodiments, transceiver system 20 can use hold mode wherein a device listens only to determine if it should become active, or park mode wherein a device transmits its address. Sniff mode assures very low power consumption and thus extends battery life. In sniff mode, a BLUETOOTH master radio frequency unit (e.g., base) addresses a slave radio frequency unit (e.g., remote), which enables the slave to synchronize to the master by sending poll packets and optionally null packets over an active link, the master being arranged so that receipt of a response from the slave unit to a poll packet is sufficient to maintain the active link. The slave unit does not have to respond to all poll packets. This approach can allow the slave to preserve more (transmit) power by going into a deep sleep mode in which a low power oscillator may be used while still allowing the master unit to detect whether the slave has resynchronized or not (and thus to update a Link Supervision Timer, for example). In step 322, Bluetooth assistant is in alarm mode and monitors connection with PED.

In step 33, transceiver system 20 monitors the BLUETOOTH connection automatically. In this step, transceiver system 20 is in sniff mode, and power consumption is below 1 mA. A significant benefit of this system is the ability to monitor a connection while keeping power consumption to a very low level. This enables one of ordinary skill in the art to build portable devices in accordance with the present inventions that use small batteries (100-200 mAh), which can last for at least 2 or 3 weeks before being recharged or swapped. In step 34, on detection of connection drop, i.e., disconnection, transceiver system 20 attempts to reconnect in step 36. For example, when a connection is dropped while the system is in sleep mode or sniff mode, a BLUETOOTH system can automatically generate an event indicating connection drop. In the base and/or remote devices of the present invention, upon the BLUETOOTH system indicating a connection drop either the base and/or the remote will attempt to reconnect to one another or an alarm will be triggered in the base and/or the remote, as illustrated by issuance of an alarm in step 40.

For a mobile phone, a connection drop is generally due to one of the followings:
2. The distance between transceiver system 20 and the mobile phone is too large,
3. There is an obstacle between the two devices. The obstacle prevents communication,
4. The mobile phone is powered down,
5. Several mobile phones are not able to support more than one active BLUETOOTH connection and drop existing BLUETOOTH connections when a user activates a new BLUETOOTH device such as a headset.

To avoid problem with headsets, Bluetooth assistant 11 has the following methods have been tried:
In a less preferred embodiment, when a connection drop is detected, Bluetooth assistant 11 pages the user headset to see if the headset is active, and if so, the alarm will not go ON. This method is not compatible across different headsets as many headsets do not respond to paging when a call is active.

In another less preferred embodiment, when a connection drop is detected, Bluetooth assistant 11 pages the mobile phone to see if the mobile phone is in the vicinity, and if so, the alarm will not go ON.

This method is not compatible across different mobile phones as many mobile phones do not response to paging when a headset is active.

In another preferred embodiment, Bluetooth assistant 11 runs 2 BLUETOOTH profiles simultaneously: HFP and AGHFP, and connects to PED and to headset when headset is active. This method words, voice may experience some cracking as the processor power is split over two devices.

In step 321, when speaker 27 is folded/pulled/pushed/twisted/rolled/slid around bearing 23, the system automatically functions as a BLUETOOTH headset. Speaker 27 can also pivot, roll or slide around bearing 23 in order to provide better fit and comfort.

When speaker 27 is unfolded, pulled, slid . . . , the system is a flat device that can be carried as a key chain. The system automatically functions as a Bluetooth assistant 11 key chain that monitors proximity to a PED and issues alarm in case PED is not within proximity. Bluetooth assistant 11 can either use SPP or HFP when in alarm mode. Bluetooth assistant 11 connects with capsule 28 for:
  easy carrying as a key chain,
  protection of a speaker system or an earpiece,
  easy an quick release of a device for use as a headset when a call is made or received,
  The moveable earpiece also allows for quick deployment of a headset system when a call is made or received,
  convenient carrying of a device when a call is not made and is not received,
  Adjustable earpiece for better comfort
This design allows the Bluetooth assistant to have multiple modes:
  Bluetooth headset mode: allows user to send and receive audio wirelessly to and from PED
  Alarm mode: allows Bluetooth assistant 11 to monitor proximity of a PED and to alarm when PED is not in proximity
  Wireless key: allows Bluetooth assistant 11 to provision access codes, digital codes and private keys wirelessly to a lock system
  Car locator mode: allows PED to provide user with directions to return to his/her parked car
It allows the user:
  To have a quick access to a BLUETOOTH headset,
  To carry the BLUETOOTH headset as a keychain,
  Alarm when phone is not in proximity,
  System automatically reconnects when phone is in proximity, and alarm automatically shuts off,
  To adjust the ear piece for better comfort,
  The ear piece is shielded when not in use by inserting it in a key chain part,
  The keychain can secure access to the mobile phone, and if keychain is not within proximity, the mobile phone cannot be unlocked,
  The keychain can secure access to applications onboard the mobile phone, and if keychain is not within proximity, the access to the application cannot be granted.
  The keychain can provision access codes for unlocking a password interface or a mechanical lock,
  The keychain can provision decryption keys for decrypting sensitive data onboard a PED,
  The keychain can hold several functions such as a Bluetooth memory, flash memory, USB Flash drive, MP3/MP4 player, recording device, bio sensor, comb, flash light, lighter, home key, car key, firearm activation, key, Swiss knife, inter alia . . . .

Most BLUETOOTH headsets on the market:
- Do not have a convenient way to carry them, except by attaching them to the ear,
- Have a fixed angle between the ear piece and the main body of the device,
- Have a cover for the ear piece that is small and not practical. It also gets lost easily.

In another embodiment, the microphone comprises an extendable arm. The extendable arm can fold, rotate or slide. This allows for a smaller size for the main part, as well as good microphone voice capture capability.

In another embodiment, the battery is removed from the main body of the device and placed in a second part, such as a lid. This makes the BLUETOOTH headset lighter and smaller considering that a battery generally accounts for more than 60% of components volume. When inserted into the lid unit, the capacitor onboard the main body recharges.

In step 321, the system is in voice mode. The user may select voice mode by folding, pulling, sliding, twisting speaker 27. In step 323 the system receives voice from PED and sends it to its onboard speaker. In step 324, the system sends voice from an onboard microphone to PED. The system uses HFP protocol to send voice to/from PED.

In a preferred embodiment, if an event is detected selected from:
- single button press, double button press, multiple button press,
- switch activation,
- voice command, sound command,
- shaking device,
- removing device cover,
- folding device;

The system goes to sleep for a period of time selected from 30 minutes, 60 minutes, or any number of minutes.

Figure 4:
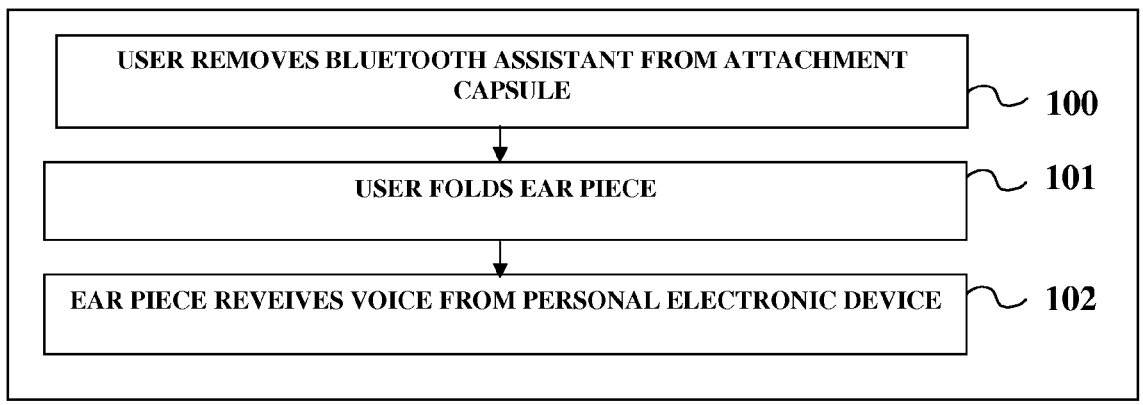
FIG. 4 is a flowchart illustrating using Bluetooth assistant as a headset.

Turning now to FIG. 4, the flowchart illustrates using Bluetooth assistant as a Bluetooth wireless headset. In step 100, the user removes Bluetooth assistant 11 from attachment capsule. Attachment capsule can be a ring for attaching to a key chain, a clip, Velcro, an attachment system for attaching to a badge, etc.

In step 101, the user moves a housing comprising the earpiece relative to Bluetooth assistant. The housing can fold up, pull up, slide, twist, detach relative to the main body in order to expose an earpiece that can fit in the ear.

In step 102, when the housing containing the earpiece move, the Bluetooth wireless headset is activated, and voice can transmit from PED to the Bluetooth assistant speaker or from the Bluetooth assistant microphone to PED.

Cars nowadays offer voice solutions when the user is inside the car, and it would be more interesting for car manufacturers to provide a total solution, regardless of where the user is. Thus, Bluetooth assistant can complement voice service through the car key when the user is outside the car. Bluetooth assistant 11 is flat when it is not inserted in the ear, and can have the shape of a headset when folded. Bluetooth assistant 11 can include a metal key to be used in case onboard battery is out of charge.

In another embodiment, Bluetooth assistant 11 can charge its battery from a vehicle's ignition system, whereby when Bluetooth assistant 11 is placed in the ignition system, it recharges.

Further, for more security, the user may provide biographic authentication such as be not limited to voice recognition, password entry, retinal scan, finger print, or other information, thus Bluetooth assistant only function if user is validated.

Since most people carry a wallet, a mobile phone and keys, Bluetooth assistant 11 provides a user with valuable all in one features and at the same time does not require the user to carry an extra device, all this thanks to Bluetooth. The features include:
- Proximity alarm for mobile phone
- Headset for mobile phone
- Locator for parked vehicle
- Vehicle keys
- Door keys In an alternative embodiment, a GPS system onboard a vehicle sends GPS information to Bluetooth assistant 11. GPS information is sent on detection of vehicle going into parking position. Alternatively, said GPS information is sent regularly. Bluetooth assistant 11 over-writes old positions with new GPS position. Bluetooth assistant 11 stores the GPS information representing the last known position of the vehicle. When the user walks away from the parked vehicle, Bluetooth assistant 11 will have the last known GPS position of the vehicle stored on it.

When the user wishes to receive instructions on returning to his/her parked vehicle, said user activates an application onboard his/her PED. PED sends a request for information to Bluetooth assistant 11. Bluetooth assistant sends GPS information representing the last known vehicle position. Bluetooth assistant 11 also obtains heading information from an onboard electronic compass and sends heading information.

PED obtains a response from Bluetooth assistant 11 containing GPS and heading information. PED uses an onboard GPS receiver to obtain new user GPS position information.

It is common knowledge that given 2 GPS positions, the distance between them can be calculated. Also, it is known that given 2 positions (origin and destination), the angle between True North and destination from origin can be calculated.

Therefore, given current heading relative to True North, a vector pointing to destination can be drawn.

PED displays distance from origin to destination. Furthermore, PED displays an arrow pointing toward destination to user. This information helps the user to return to his/her parked vehicle.

Figure 5:
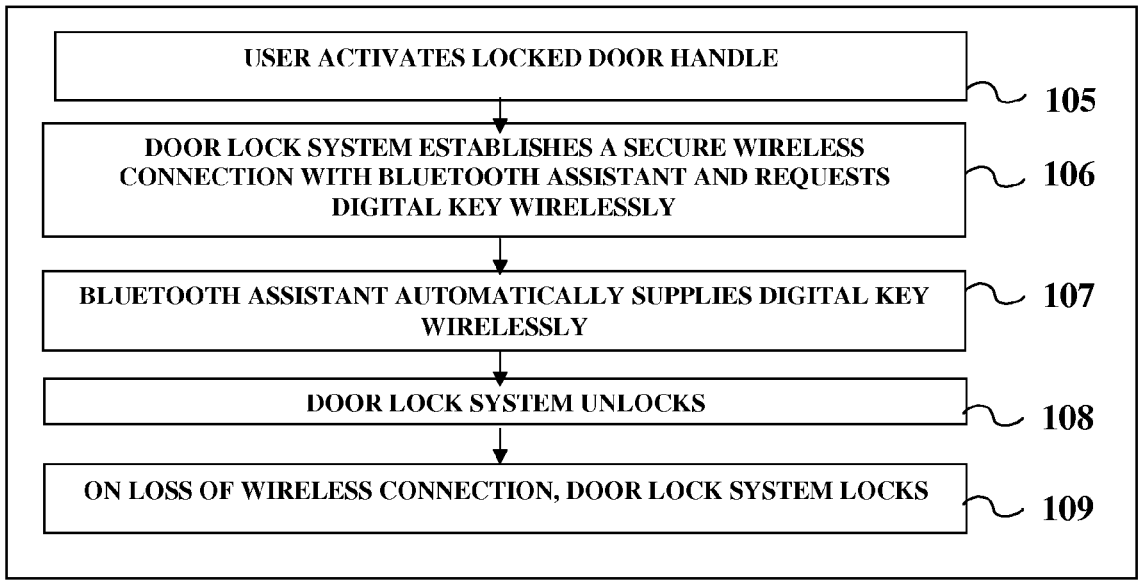
FIG. 5 is a flowchart illustrating using Bluetooth assistant to unlock a door.

Turning to FIG. 5, the flowchart illustrates the operation of Bluetooth assistant as a Bluetooth key. In step 105, a user tries to access a lock system. A lock system can be an electronic lock that activates a mechanical lock, a software interface that activates a lock screen or a password screen, a software interface that encrypts data, a software interface that blocks user from accessing a personal electronic device, any other locking system. For example, user activates handle of locked door, a user clicks on a locked/encrypted file . . . . In step 106, the lock system establishes a secure tow-way wireless connection with Bluetooth assistant and requests a digital key. The digital key can be a private key/public key/part of a private key/part of a public key, an encoded/encrypted/obfuscated private key/public key/part of a private key/part of a public key. The lock system may send an obfuscation/encrypted formula so that Bluetooth assistant can obfuscate/encrypt transmitted information, can return it within a predetermined period (for example a second) and so that the lock system may de-obfuscate/de-crypt the returned result. In step 107, Bluetooth assistant 11 automatically returns digital key wirelessly, and in step 108, the lock system unlocks. In step 109, the lock system may try to maintain a wireless connection with Bluetooth assistant, and on detection of a connection drop, lock.

A user can purchase/acquire/install a lock system that comes with a digital access code (provided on a CD, memory card, USB flash, email, or any way for transferring digital data). The user can later update Bluetooth assistant 11 with the new digital access code by connecting Bluetooth assistant 11 to a PED, and transferring the new digital access code to Bluetooth assistant 11. The new digital code will be stored onboard Bluetooth assistant 11. The new digital code may be transferred to Bluetooth assistant 11 through SPI flashing.

In a preferred embodiment, Bluetooth assistant 11 stores a part of a private key. It receives a message from PED containing an obfuscation formula, for example, a large random number and a code for an obfuscation formula.

pK=private key
ppK=part of private key
oppK=obfuscated part of private key stored on mobile device
r=random number generated by PED
f=obfuscation function
cf=code for obfuscation formula generated by PED
I=data sent from PED to Bluetooth assistant $$>>I=r,cf$$

(cf) changes every time or periodically. Bluetooth assistant 11 knows how to interpret (cf) and convert it to a function.

(r) is a random string or number. For example, a 128 byte string or number. Function (f) may be: ADD, DELETE, MULTIPLY, SHIFT ONE BIT THEN ADD, AND, OR, NAND, NOR, APPEND, REVERSE THEN ADD, COMBINE BIT . . . .

Function (f) may be applied to (r) and to (oppK) and the result of the function is sent to PED. Bluetooth assistant 11 must be programmed with the codes (cf) and associated obfuscation/transformation.

PED awaits receipt of key in step 86 in real-time, i.e. within a predetermined period (such as 0.5 second or less than 1 second).

O=data sent from Bluetooth assistant to PED $$>>O=f(r,oppK)$$

PED de-obfuscates or decrypts received key.
f*=reverse of obfuscation function $$oppK=f^*(O,r)$$

PED can also de-obfuscate (oppK) to obtain (ppK). PED uses (ppK) as well as information from user password to obtain private key (pK). The application may extract a second part of private key from pre-known positions of the user password and use the first part and second part to form a private key. (In this case, at initiation of a user password, the user is given some codes that he/she must use as part of a personal password and at specific positions. These codes represent part of the private key. For example, the user is given a choice for the first 5 digits of a password, and is instructed to use 3 specific digits at the end. Another example, is the user must use 4 specific digits at the front, and 4-6 own digits next. Another example is the user is given a specific password, etc. . . . ). In a preferred embodiment, the user is asked for password the first time sensitive data is requested, but after that, authentication is done wirelessly in real-time without requesting information from the user, thus the process is unobtrusive to the user. It uses the private key to decrypt encrypted data and to provide it to the user. It is important to note that the key is generated in real-time every time encrypted data is requested, and that the key is not stored in memory for a long period (more than the time required to decrypt the data) and is not stored on data storage device. It is also important to note that decrypted data is not written to data storage device.

If user requests more data, the key is generated again, and more data is decrypted. Furthermore, if the user requests a data volume larger than a predetermined amount, then only predetermined amount is decrypted. Also, if the user requests more data than available RAM memory, then only volume of data that can be kept in available RAM memory is decrypted. This ensures that decrypted data is never stored on data storage device.

PED can also request a digital key from Bluetooth assistant 11. If a positive response is received, user access to PED is authorized, and if not, user access is denied. For example, on user activating a mobile phone or a firearm device, the mobile phone will check that Bluetooth assistant 11 is within proximity. If confirmed, the phone is unlocked and the user does not have to enter a password.

Another example is on user pressing a keyboard key; the computer will check that Bluetooth assistant 11 is within vicinity. If confirmed, the computer will automatically log the user in and the user does not have to enter a password in the Windows password screen. In this example, the wireless range of Bluetooth assistant 11 may be reduced to minimum range. A Class 3 Bluetooth transceiver may be used or the antenna may be removed so that Bluetooth assistant 11 has minimum range. If the computer finds more than one authorized user in its vicinity, the computer may ask the user for further authentication or challenge questions.

In another embodiment, on user trying to access a protected address such as a URL or link, a protected file, an encrypted file, an encrypted record, or a protected database, an application/program running on said paired PED sends a message to said Bluetooth assistant 11 requesting a digital key. The message may include an address for which a password is sought. Said Bluetooth assistant 11 automatically sends said digital key. Said digital key may be input in the appropriate fields for authentication or decryption.

This method has the following advantages:
1—Real-time: all the operations can be performed in real-time
2—Simple: uses simple processing and does not require any processor with more than 100 MIPS or more. All operations can be performed by a microcontroller or small power processor
3—Secure channels: channels used a secure using Bluetooth security and it is difficult for hackers to copy the data transmitted
4—Time bound: response to a specific operation must be given within a very short time (less than one second) of sending the operation. It would be impossible for a hacker to interpret the transformation method and send a response in the allocated time period
5—The sent message consisting of a very large random number, a very small changing operation code, and a changing transformation method, results in a random result sent from Bluetooth assistant 11 to PED with no obvious relationship to the sent message. The larger the number of obfuscation/transformation methods, the harder it is to find any relationship between the received message and the generated message
6—The key is not stored on the same physical medium as the data
7—A portion of the key is help on a mobile device, and the other portion is extracted from the user, thus even if the mobile device is cloned without the user knowing, the mobile device cannot be used to access the data directly
8—A periodic check with a remote server is performed to ensure that PED and Bluetooth assistant 11 have not been stolen together. If a thief steals both PED and Bluetooth assistant 11, the thief has a limited window of time to decode the second part of the private key. One the periodic check with remote server is performed, PED will be instructed to self-destroy. Also, in the absence of successful connection, PED will either destroy sensitive data.

a. In a preferred embodiment, Bluetooth assistant 11 is used to store a part of a private key in a separate location from sensitive data and to supply it to decryption interface in real time when needed to be used as a decryption key. Bluetooth assistant 11 provides a secure and safe location to store a private key, a part of a private key, or an obfuscated private key/part of a private key in a way that provides far better security and hacker safe system that any other available method.

b. The private key is made completely hacker proof by partitioning it in multiple parts, obfuscating/encrypting a part of the private key and storing it on a mobile device. Furthermore, communication with mobile device is made safe by ensuring close to random data transmission between PED and the mobile device, and close to random data transmission between the mobile device and PED. The correlation factor between the data sent from the PED to the mobile device and the data sent from the mobile device to PED is kept close to a minimum by using the following formulas:

c. When Bluetooth assistant 11 is paired with PED, it becomes undiscoverable, and will never be able to pair again unless re-flashed through communication center 25. This ensures that Bluetooth assistant 11 can only be used with one or more PEDs to which it was originally paired and if lost, it cannot be used to access or decrypt data on any other PED. Also, when Bluetooth assistant 11 is lost, the user/administrator can un-pair PED from a PED console or from a remote console. The lost Bluetooth assistant 11 will no longer cause any security threat to PED or to other PEDs. Furthermore, information onboard Bluetooth assistant 11 is obfuscated or encrypted so that a hacker cannot use it. Information onboard of Bluetooth assistant 11 is a part of private key which is not useful unless it is de-obfuscated, decrypted, and combined with another part of private key extracted from a user password.

d. These methods provide for a very secure data access method, or a data decryption system and method that cannot be breached even when a Bluetooth assistant 11 device is lost.

In case of unauthorized access, the data will be encrypted and cannot be opened unless in the absence of Bluetooth assistant 11 which supplies a part of the private key and of the user who supplies a password containing another part of the private key. Furthermore, viruses, Trojan Horses and spywares are ineffective because the data on the storage device or solid state memory is encrypted.

The present invention also secures content onboard the portable electronic device. It presents a comprehensive solution that ensures that content is protected to a maximum level, and cannot be tempered with. This solution involves minimum effort on the part of the user, and ensures minimum risk of exposure in case of a theft of a personal electronic device or a Bluetooth assistant 11 occurs.

Public-key infrastructure (PKI) ensures that people are who they say they are and also proves that documents haven't been tampered with.

PKI uses extremely long prime numbers, called keys. In preferred embodiment, keys are 128 bytes long or longer. Two keys are involved—a Private Key, which the owner of the information has access to, and a Public Key, which can be accessed by anyone. The two keys work together, so a message scrambled with the Private Key can only be unscrambled with the Public Key and vice versa. The more digits in these keys, the more secure the process.

A large piece of data set to be encoded—for instance, a document—is run through a complicated mathematical computation to generate a single large number, called a hash. The original data and the hash are inextricably linked. If either changes, the hash won't match. Any entity can verify the validity of the document by checking a stored hash against a hash computed from the data. If the hashes match, the data was not tampered with.

Since the present invention seeks to protect PED as well as data onboard PED, Public Key infrastructure (PKI) is used to generate a set of Public Key and Private Key unique for each user. A Bluetooth assistant 11 is assigned to each user for storing the Public Key (or alternatively the Private Key), and an application/driver/program/chipset/plug-in/file manager/data base manager containing the Private Key (or alternatively the Public Key) is installed on the user PED. Sensitive data on PED storage medium (hard drive, solid state memory, Flash, network drive, CD Rom, Zip drive, Bluetooth drive) is kept encrypted at all time, using Private Key (or alternatively the Public Key). A hash may be generated and stored every time the data is updated.

On user request to read data, a request is made to Bluetooth assistant 11 to get the Public Key, and the requested data is decrypted using the key. The requested data is presented through an authorized application. The hash may be generated again and compared with the stored hash key to ensure the data has not been tempered with. When the user request data, the hash key for the data may be validated against the old hast key to ensure the data has not been tempered with.

Figure 6:
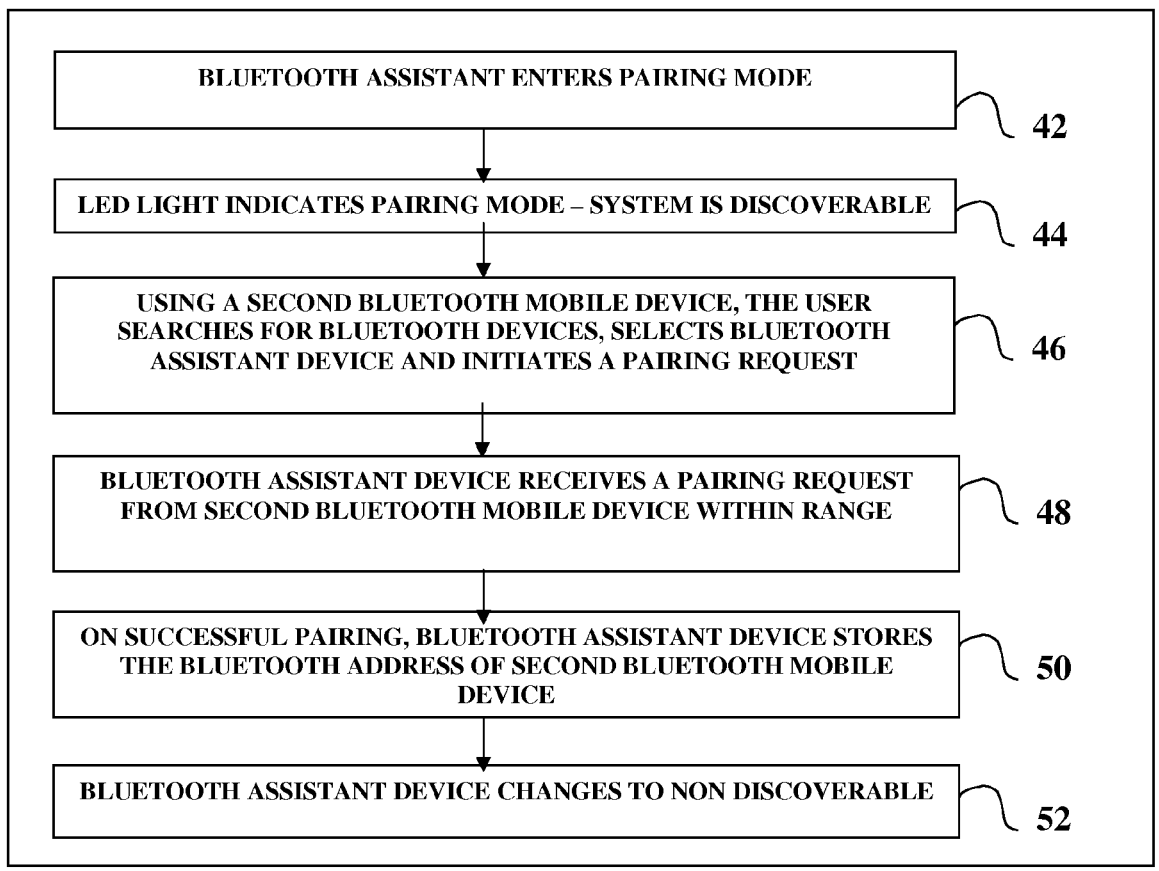
FIG. 6 is a flowchart illustrating initiating Bluetooth assistant device.

Turning now to FIG. 6, the flowchart illustrates initiating Bluetooth assistant device 11. In step 42, Bluetooth assistant 11 enters pairing mode. In step 44, visual indication center 16 can indicate pairing mode using a combination of LED effects, for example, alternating colored LEDs. When transceiver system 20 is set to discoverable mode, in accordance with step 46 the user uses a second BLUETOOTH PED to be monitored to search for BLUETOOTH devices in range and to select the Bluetooth assistant 11 from the search list.

When the user initiates a pairing request, as shown in step 48, Bluetooth assistant 11 receives a pairing request from a second device, and requests a PIN code. On successful pairing in step 50, Bluetooth assistant 11 obtains the BLUETOOTH address of second device and stores it in memory as shown by step 52. Transceiver system 20 changes to non-discoverable mode and visual information center 16 changes to normal mode.

In another embodiment, after pairing, transceiver system 20 may send a file to second BLUETOOTH device using OPP profile. This file can be one or more promotional files such a brochures, music, video, or application software such as a driver, a game, a client application, etc.

Figure 7:
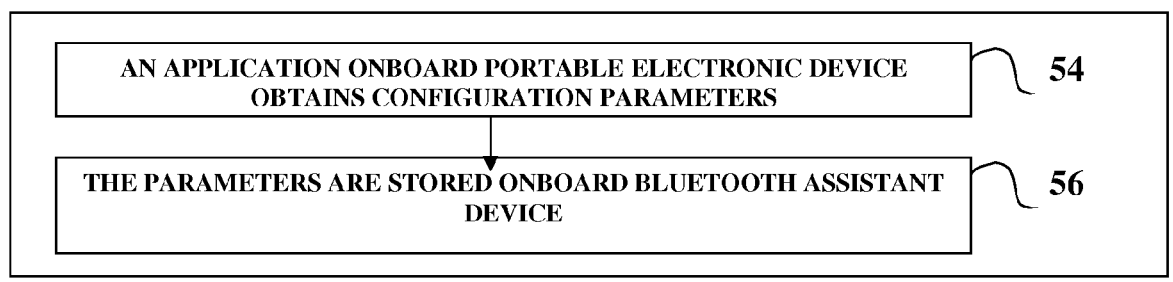
FIG. 7 is a flowchart illustrating configuring Bluetooth assistant device.

Turning now to FIG. 7, the flowchart illustrates an alternative embodiment using an application onboard the monitored device. The client application is used to configure Bluetooth assistant 11. In step 54, an application running on PED obtains configuration parameters. Configuration parameters include digital keys, passwords, as well as operation hours, operation days, buzzer type, buzzer volume, buzzer duration, range and alarm type. Bluetooth assistant 11 is connected to PED through an interface cable that connects USB or LPT port on the PED to communication center 25 on Bluetooth assistant 11.

The configuration parameters can be supplied through an application or through a remote administration console and are stored or flashed onboard Bluetooth assistant 11 in step 56 and can be used to change the properties or the program of Bluetooth assistant 11.

The details of certain embodiments of the present inventions have been described, which are provided as illustrative examples so as to enable those of ordinary skill in the art to practice the inventions. The summary, figures, abstract and further details provided are not meant to limit the scope of the present inventions, but to be exemplary. Where certain elements of the present inventions can be partially or fully implemented using known components, only those portions of such known components that are necessary for an understanding of the present invention are described, and detailed descriptions of other portions of such known components are omitted so as to avoid obscuring the invention. Further, the present invention encompasses present and future known equivalents to the components referred to herein.

The inventions are capable of other embodiments and of being practiced and carried out in various ways, and as such, those skilled in the art will appreciate that the conception upon which this disclosure is based may readily be utilized as a basis for the designing of other methods and systems for carrying out the several purposes of the present inventions. Therefore, the claims should be regarded as including all equivalent constructions insofar as they do not depart from the spirit and scope of the present invention. The following claims are a part of the detailed description of the invention and should be treated as being included in this specification.

The invention claimed is:

1. A first apparatus for assisting with communications and control, comprising:
   a first part comprising an attachment system,
   a second part comprising:
      a single wireless transceiver integrated circuit selected from the group consisting of BLUETOOTH, Wifi, and Wibree,
      a power input,
   a third part comprising an audio system,
   wherein said third part further comprises a first housing that can move relative to said second part,
   wherein said first apparatus can pair with at least one apparatus that has a compatible transceiver in a first range,
   wherein said first apparatus can store digital keys for unlocking at least one second apparatus selected from the group consisting of a lock, a mobile phone a computer, and a memory, and
   said first apparatus further comprises a data port for updating information stored onboard said first apparatus,
   wherein when a first event occurs, said first apparatus automatically operates as a wireless headset device,
   wherein said first event is selected from the group consisting of activating a switch, detaching said first detachable part, moving said third part, receiving a wireless message, and receiving a voice command,
   said first device further comprising an alarm, wherein said alarm is audible and when activated produces an alarm sound audible from a distance greater than 3 feet, wherein said first apparatus can monitor proximity to a paired second apparatus,
   wherein upon said first apparatus detecting a connection drop from said paired second apparatus, said first apparatus periodically attempts to reconnect to said paired second apparatus, and if connection is not established within a predetermined period, said alarm is automatically activated.

2. The first apparatus of claim 1, wherein said attachment system is selected from the group consisting of a ring, a key chain, a clip, a Velcro attachment device, a capsule, and a capsule with a power storage device.

3. The first apparatus of claim 1, wherein
   said audio system is selected from the group consisting of an ear piece, an earphone, a speaker, and a microphone, wherein
   said first housing can perform at least one movement relative to said second part, said at least one movement selected from the group consisting of fold, unfold, pivot, rotate, twist, slide, and pull up.

4. The first apparatus of claim 1, further comprising a fourth part,
   said fourth part being at least one selected from the group consisting of a microphone, a key, USB Flash, Flash memory, MP3 player, and a bio sensor to validate a user and activate said first apparatus,
   wherein, when said fourth part comprises a bio sensor, said bio sensor is selected from the group consisting of a voice recognition system, a retinal scan system, and a finger print system.

5. The first apparatus of claim 1, wherein:
   on activation, said first apparatus can automatically establish a secure two-way wireless connection with a paired second apparatus within vicinity.

6. The first apparatus of claim 1, wherein:
   when unfolded, said first apparatus can automatically monitor proximity to a paired second apparatus, but cannot monitor proximity to a second paired apparatus when unfolded.

7. The first apparatus of claim 1, further comprising:
   an LED, wherein said LED can flash periodically, and
   said LED can illuminate a logo.

8. The first apparatus of claim 1, wherein:
   said first apparatus fits into a space having a volume of less than 10 cubic centimeters,
   wherein said first apparatus has a weight of less than about 10 grams,
   and wherein said first apparatus has power consumption of less than 40 mA.

9. A method for using a Bluetooth wireless headset comprising the steps of:
   detaching a Bluetooth wireless headset from a first part, the first part comprising an attachment system,
   on moving a second part relative to the Bluetooth wireless headset wirelessly receiving voice from a paired personal electronic device, the second part comprising an audio system,
   storing one or more digital keys selected from the group consisting of a digital key, a public key, a private key, an encrypted key, a partial key, an encrypted partial key, an obfuscated partial key, and a password, wherein on receipt of a wireless message, transmitting said one or more digital keys wirelessly to a paired personal electronic device, said method further comprising:
   pairing the Bluetooth wireless headset with a personal electronic device in a first range, wherein when a first event occurs automatically establishing a secure two-way wireless connection with the personal electronic device, said first event selected from the group consisting of
   activating a switch,
   receiving a voice command, detaching said first part,
moving said second part, and
receiving a wireless message.

10. The method of claim 9 comprising:
automatically wirelessly transmitting a file to the paired portable electronic device.

11. The method of claim 9, whereby:
on the paired personal electronic device receiving said one or more digital keys, the paired personal electronic device performs an action selected from the group consisting of:
enabling user access, decrypting a file, launching an application, unlocking a phone, unlocking a screen, unlocking a file, unlocking a door, activating a mechanical apparatus, unlocking a mechanical apparatus, triggering a mechanical apparatus, starting an engine, and activating a relay.

12. The method of claim 9, further comprising the steps of:
receiving information from compatible transceivers, and
displaying the data on an onboard display.

13. The method of claim 9, further comprising the steps of:
connecting a data cable, and
SPI flashing said the data.

14. The method of claim 9, further comprising the steps of:
wirelessly receiving GPS information from a vehicle,
storing GPS information,
on receiving a request from a personal electronic device,
obtaining heading information from an onboard electronic compass,
sending the GPS information and heading information to said personal electronic device.

* * * * *